United States Patent [19]
Savoie

[11] Patent Number: 5,919,013
[45] Date of Patent: Jul. 6, 1999

[54] OPTHALMIC LENS GENERATING APPARATUS HAVING VIBRATION DAMPENING STRUCTURE

[75] Inventor: Marc Y. Savoie, Moncton, Canada

[73] Assignee: Micro Optics Design Corporation, Irvine, Calif.

[21] Appl. No.: 08/868,884

[22] Filed: Jun. 4, 1997

Related U.S. Application Data

[63] Continuation-in-part of application No. 08/561,404, Nov. 21, 1995, Pat. No. 5,678,967.

[51] Int. Cl.$^6$ ............................................. B23C 9/00
[52] U.S. Cl. ............................ 409/141; 74/574; 82/149; 408/143; 408/234; 409/235
[58] Field of Search ................................. 409/141, 235, 409/337; 408/234, 143; 82/149; 74/573 R, 574

[56] References Cited

U.S. PATENT DOCUMENTS

| | | | |
|---|---|---|---|
| 2,393,907 | 1/1946 | Herfurth | 408/143 |
| 3,618,432 | 11/1971 | Briese | 82/149 |
| 3,955,472 | 5/1976 | Frankiw et al. | 408/234 |
| 4,193,724 | 3/1980 | Morse | 409/143 |
| 4,434,581 | 3/1984 | Spriggs | 451/173 |
| 4,760,672 | 8/1988 | Darcangelo et al. | 451/42 |
| 5,549,019 | 8/1996 | Cattani | 408/143 |
| 5,678,967 | 10/1997 | Savoie | 409/233 |

*Primary Examiner*—Andrea Pitts
*Assistant Examiner*—Christopher Kirkman
*Attorney, Agent, or Firm*—Thomas R. Lampe

[57] ABSTRACT

An ophthalmic lens generating apparatus having a tool spindle comprising a motor, a lens surfacing tool and a coupling mounted between the motor and the lens surfacing tool for retaining the lens surfacing tool to the arbor of the motor. The apparatus of the present invention also comprises a first actuated table supporting the tool spindle in a movable manner along the longitudinal axis of the apparatus. A massive base is mounted beneath the first actuated table for supporting the table and for dampening radial vibrations of the tool spindle. The apparatus further comprises a lens holder for holding an ophthalmic lens in a plane substantially perpendicular to the longitudinal axis of the apparatus. A massive upright block is mounted on one end of the massive base behind the structural support supporting the lens holder, for dampening axial vibrations of the tool spindle and of the lens holder. The coupling of the tool spindle is a kinematic coupling having first and second disks having each substantial mass and radius of gyration. Thus, when the tool spindle rotates, both disks increase the nominal moment of inertia of the spindle and dampen the torsional vibrations of the spindle.

20 Claims, 5 Drawing Sheets

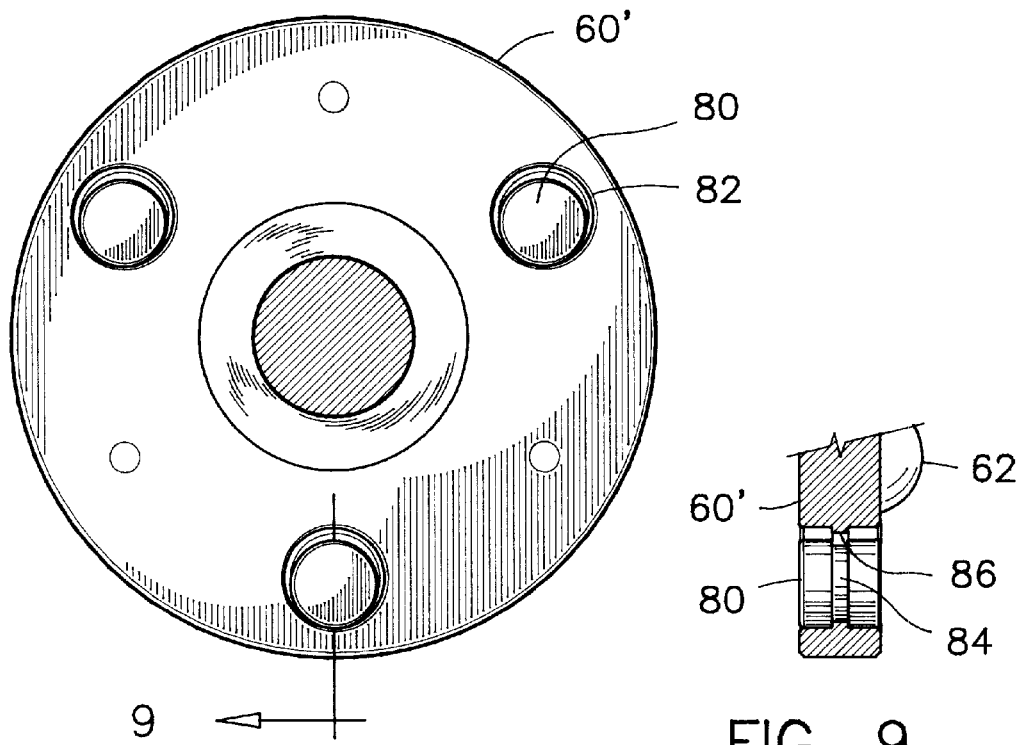
FIG. 8
FIG. 9
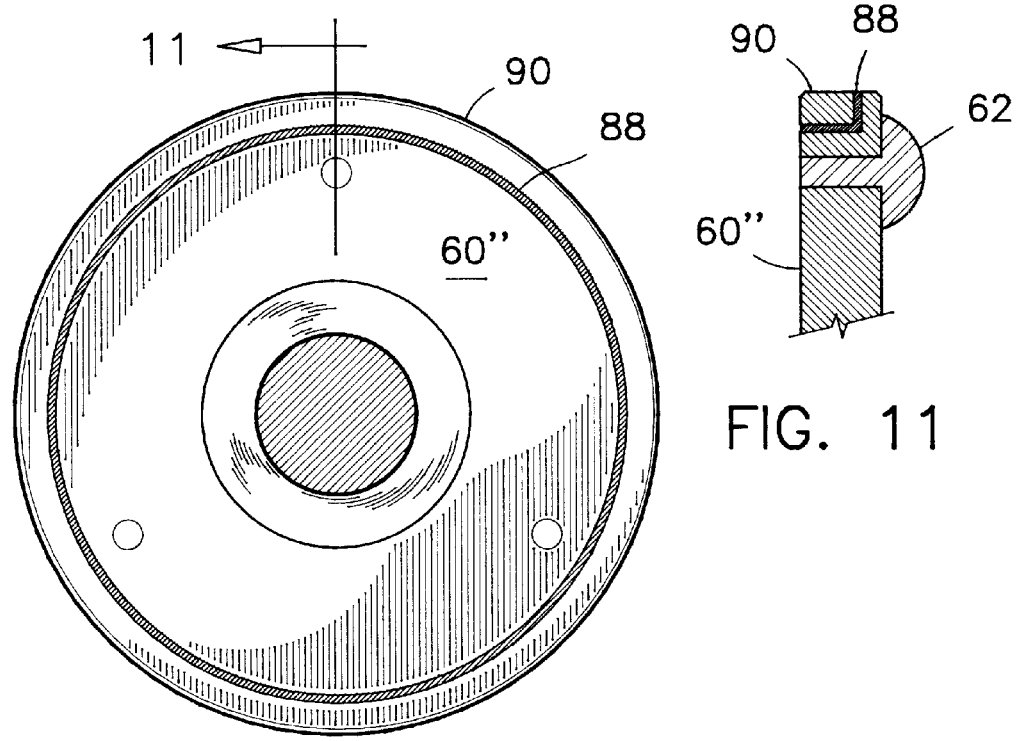
FIG. 10
FIG. 11

OPTHALMIC LENS GENERATING APPARATUS HAVING VIBRATION DAMPENING STRUCTURE

This is a continuation-in-part of U.S. patent application Ser. No. 08/561,404, filed Nov. 21, 1995, now U.S. Pat. No. 5,678,967.

FIELD OF THE INVENTION

This invention relates to ophthalmic lens generating apparatus and more particularly, the present invention relates to ophthalmic lens generating apparatus having vibration dampening properties.

BACKGROUND OF THE INVENTION

The surface finish on an ophthalmic lens is generally affected by two common types of surface defects inherent in a lens machining operation. The first type of defects is caused by the actual removal of material from the lens surface, and the second type is caused by the vibration of one or more of the machine's elements.

The major factors influencing surface defects of the first type are the outline of the cutting tool in contact with the lens, the microstructure and chemical composition of the material of the lens, and thermal effects occurring during the material-removal process. In this respect, improvement in surface finish may be obtained to various degrees by increasing the cutting speed, decreasing the feed of cut and changes in cutting fluid and tool geometry.

Surface defects of the first type generally have surface irregularities of a relatively small extent; usually less than 78 microinches (2 microns) peak-to-valley. This type of surface defects is usually entirely coverable by a clear resinous coating well known in the art of lens making.

Vibration of machine elements, however, is often the cause of deeper irregularities on the surface of generated lenses. Vibration of machine elements is very complex, and often has a combination of interrelated causes as explained below.

Rotating machines in general are known to vibrate according to three basic types of vibration. A first basic type of vibration is caused for example, by an unbalance of the tool, eccentricity in the tool chuck, and defects in a drive belt. This first type of vibration has an amplitude in a radial direction relative to the axis of rotation of the tool.

The second basic type of vibration in rotating machines has an amplitude in an axial direction along the axis of rotation of the tool spindle for example. This axial vibration is often caused by a vacillating plane of rotation of the tool's cutting face, or by intermittent cutting forces. Because the cutting force applied on a tool has a vectorial component in the axial direction, a vibration of the radial type also tends to cause a vibration in the axial direction.

The third basic type of vibration in rotating machines is a torsional vibration. This type of vibration is often associated with torque pulses inherent with some types of electric motors and motor controls. These pulses tend to alternatively increase and reduce the amount of material being removed from the surface of the lens during a full rotation of the tool. This torsional vibration, when cutting forces are present, is also known to cause vibration of the radial and axial types.

It is further known from the science of vibration analysis that any of the above three types of vibration can excite a resonant condition in the structure of the machine, with the consequence of increasing the amplitude of the vibrating element.

The problem of vibration in a lens generating apparatus has been partially addressed in the past. For example, a first apparatus for manufacturing ophthalmic lenses is described in U.S. Pat. No. 4,434,581 issued on Mar. 6, 1984 to Robert G. Spriggs. This apparatus has X-Y fluid-bearing tables mounted on a granite bed weighing about 4,000 pounds. This bed is undoubtedly particularly efficient for reducing the amplitude of a vibration in the radial direction, that is in a direction perpendicular to the table. However, it will be appreciated that a massive table is less appropriate for reducing vibrations of the axial and torsional types where the lens holder or the tool spindle is mounted at some distance for the surface of that table.

In another example, U.S. Pat. No. 4,760,672 issued on Aug. 2, 1988 to Darcangelo et al. describes a lens grinding and polishing apparatus wherein a drive motor is mounted remotely from the tool supporting table, and is driving a micrometer drive via a drive belt. This type of mounting isolates the tool and work spindles from the vibration of the drive motor.

Although the apparatus in both the above examples are most likely efficient in dampening the radial vibrations of the tool and work support spindles, these apparatus as well as other optical lens generating apparatus of the prior art lack vibration dampening properties in the axial and circumferential directions relative to the rotary tool and work holder.

SUMMARY OF THE INVENTION

In the present invention, however, there is provided an ophthalmic lens generating apparatus having a massive base for dampening radial vibrations, a massive upright block for dampening axial vibrations and a high-inertia tool spindle for dampening the torsional vibrations of the rotating elements of the apparatus.

In one aspect of the present invention, there is provided an ophthalmic lens generating apparatus having a tool spindle comprising a motor, a lens surfacing tool and a coupling mounted between the motor and the lens surfacing tool for retaining the lens surfacing tool to the arbor of the motor. The apparatus of the present invention also comprises a first actuated table mounted under the tool spindle for supporting the tool spindle in a movable manner along the longitudinal axis of the apparatus. The massive base is mounted beneath the first actuated table for supporting the table and for dampening vibrations of the tool spindle having a displacement in a direction generally perpendicular to the longitudinal axis of the apparatus.

The apparatus of the present invention further comprises a lens holder having chuck means and structural lens-holder-support means for holding an ophthalmic lens in a plane substantially perpendicular to the longitudinal axis of the apparatus. A massive upright block is mounted on the massive base behind the structural lens-holder-support means for supporting the structural lens-holder-support means and for dampening vibrations of the tool spindle and of the lens holder, having a displacement in a direction generally parallel to the longitudinal axis of the apparatus. Computerized control means are further provided for operating the spindle and the first movable table, and for moving the lens surfacing tool along a prescribed path relative to the lens holder.

The major advantage of the apparatus of the present invention is that the optical surfaces generated thereon are exceptionally smooth. The ophthalmic lenses generated on the apparatus of the present invention have a surface finish which is an optically acceptable final finish, and no further polishing is required.

In another aspect of the present invention, the tool spindle has a nominal moment of inertia about an axis of rotation thereof, and the coupling is a kinematic coupling having first and second circular disks. The first and second circular disks have a respective mass and radius of gyration whereby when the tool spindle rotates about its axis of rotation, both disks increase the nominal moment of inertia of the spindle and enhance the dampening of the torsional vibrations of the spindle.

As will be explained later, a radial vibration of a lens grinding tool is substantially tangential to the surface of the lens being generated. This type of vibration leaves only superficial impressions on the surface of a lens. The axial vibration, however, is substantially perpendicular to the surface of the lens and contributes largely to the roughness of the lens surface. Similarly, torsional vibrations coupled with axial vibrations tend to form circular grooves detrimental to generating high quality surfaces on optical lenses.

While the dampening of axial and torsional vibrations in ophthalmic lens generating apparatus has been generally overlooked in the past, the apparatus of the present invention has dampening structure to reduce the effect of the most common types of vibrations found in rotating machines. The ophthalmic lens generating apparatus of the present invention has a plurality of vibration dampening masses which are cooperatively positioned to absorb the radial, axial and torsional vibrations of the elements of the apparatus. As a result, an optically acceptable final surface finish is obtainable in a single operation.

BRIEF DESCRIPTION OF THE DRAWINGS

The preferred embodiment of the present invention will be further understood from the following description, with reference to the drawings in which:

FIG. 8 illustrates a first type of dynamic vibration absorber.

FIG. 9 is a cross-section view along line 9 in FIG. 8 illustrating a cylindrical auxiliary mass.

FIG. 10 illustrates a second type of dynamic vibration absorber.

FIG. 11 is a cross-section view along line 11 in FIG. 10 illustrating a ring-shaped auxiliary mass.

DETAILED DESCRIPTION OF THE PREFERRED EMBODIMENT

Figure 1:
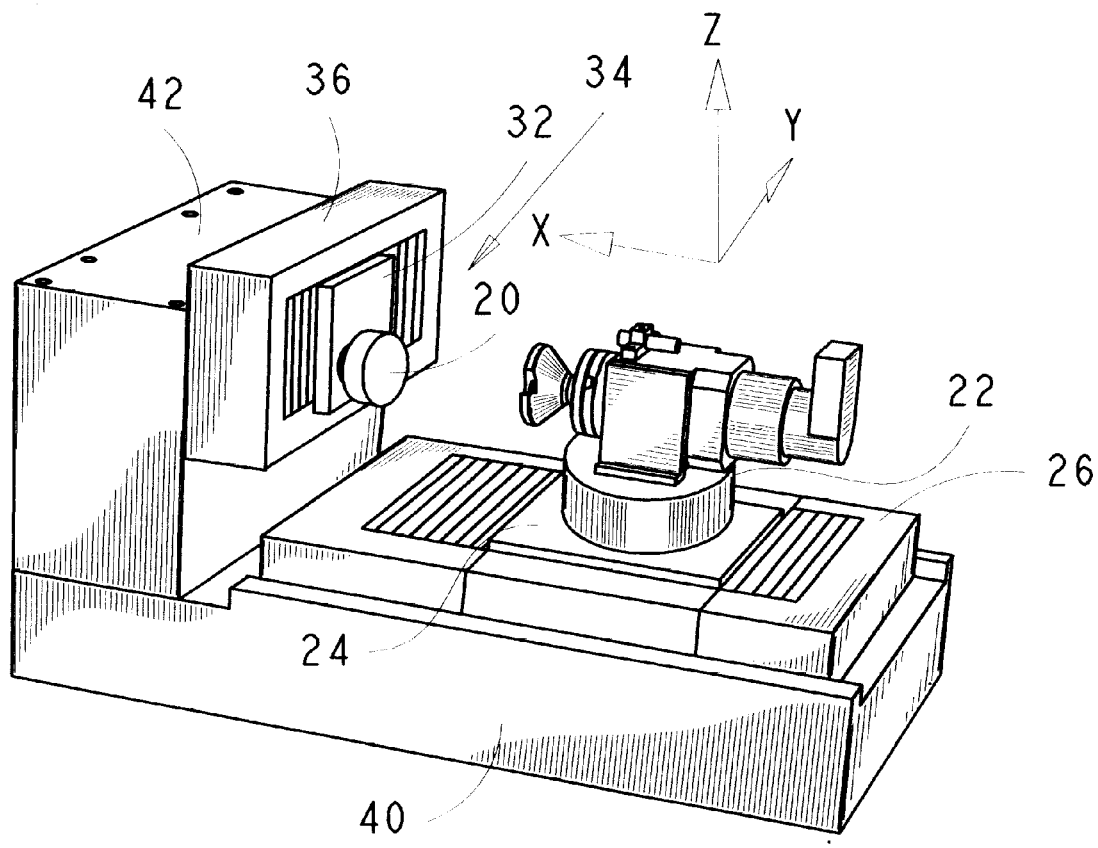
FIG. 1 is a top and left side perspective view of the ophthalmic lens generating apparatus of the preferred embodiment.
Figure 2:
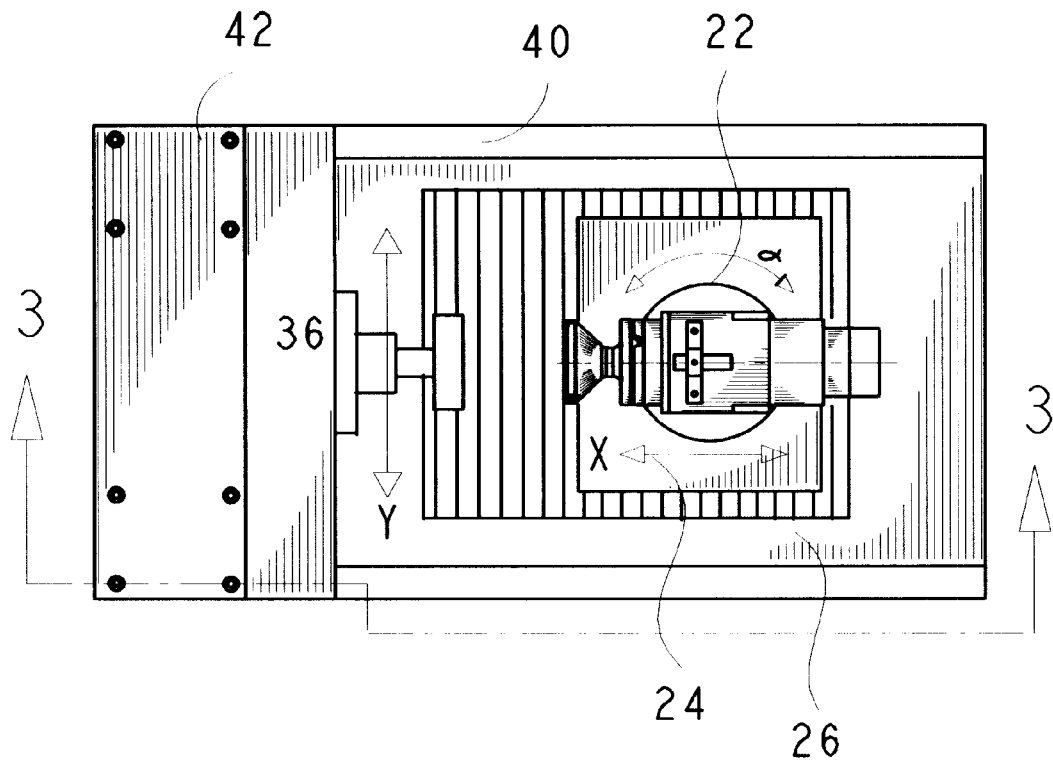
FIG. 2 is a top view of the ophthalmic lens generating apparatus of the preferred embodiment.
Figure 3:
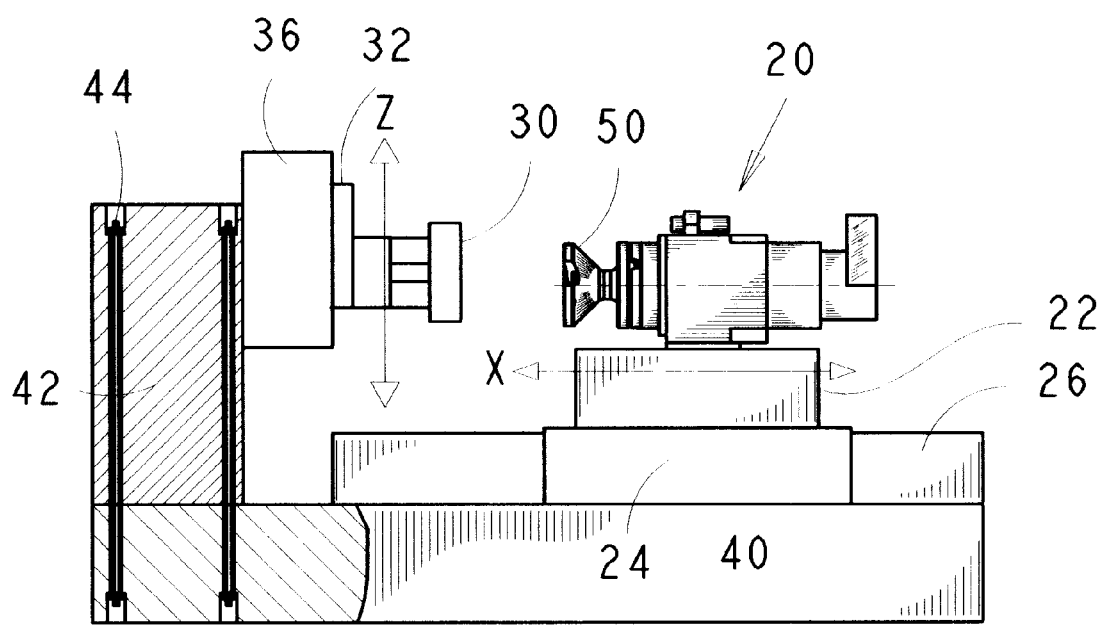
FIG. 3 is a left side, partial sectional view of the ophthalmic lens generating apparatus of the preferred embodiment, as taken along line 3—3 in FIG. 2.

The ophthalmic lens generating apparatus of the preferred embodiment is illustrated in its entirety in FIGS. 1, 2 and 3.

The apparatus of the preferred embodiment comprises a tool spindle 20 which is mounted on a support structure having at least two degrees of freedom. The tool spindle 20 is mounted on an actuated turntable 22 which is pivotal about a vertical axis along the generally illustrated Z-axis, in a direction designated by α in FIG. 2. The turntable 22 is mounted on a base plate 24 which is movable on a first actuated linear slide 26 along the longitudinal axis of the apparatus. The longitudinal axis is generally designated as the X-axis of the apparatus.

A lens holder 30 is also supported on a movable mounting plate 32. The mounting plate 32 comprises part of a second actuated linear slide 34' slidably accommodated within a third actuated linear slide 36. The second linear slide 34' including the mounting plate 32 move up and down along the Z-axis, and the third linear slide 36 moves the plate 32 transversely relative to the longitudinal axis of the apparatus along the generally designated Y-axis.

The lens holder 30 may also be rotatable about an axis parallel to the longitudinal axis by means of a rotary actuator (not shown), for the purpose of angularly positioning a lens according to the requirement of a prescription, prior to the lens-surface generating process.

All the linear slides 26, 34' and 36 are preferably mounted on high-precision pressurized fluid bearings. Similarly the turntable 22 and the tool spindle 20 are also preferably mounted on high-precision fluid bearings. Since such bearings are well-known types of bearings generally, they have not been illustrated.

The movements of the actuated linear slides and the actuated turntable are controlled by computer (not shown) according to the requirements of a prescription of the lens to be generated. During operation of the ophthalmic lens generating apparatus of the preferred embodiment, the tool spindle 20 advances toward the lens along the X-axis, and pivots about the Z-axis in a clockwise direction when viewed from above the apparatus. The lens holder 30 moves along the Y-axis simultaneously to the movement of the tool spindle 20, such that an arc along the edge of the tool describes a determined curvature across the surface of the lens. The arc along the edge of the tool and the determined curvature define a toric surface on the lens.

The ophthalmic lens generating apparatus of the preferred embodiment also has a massive granite base 40 which contributes largely to the overall stiffness and stability of the machine. The granite base 40 is especially efficient in absorbing the vibrations of the tool spindle 20 and of the lens holder 30 in a radial direction relative to the spindle and holder and the mass of base 40 must have a magnitude sufficient for such purpose.

The structure of the apparatus of the preferred embodiment also comprises a massive upright granite block 42 supporting the third linear slide 36. The primary purpose of this upright granite block 42 is for absorbing the vibration of the lens holder 30, and the tool spindle 20 in the axial direction relative to the lens holder 30 and the block 42 must have adequate mass for such purpose. The upright granite block 42 is affixed to the granite base 40 by means of through bolts 44 as illustrated in FIG. 3.

Representative preferred characteristics for the massive granite base 40 and the massive upright granite block 42 are as follows:

Granite Base: 32 inches wide by 60 inches long by 8 inches thick; having a total weight of 1,536 lbs.

Upright Granite Block: 31 inches wide by 24 inches high by 14 inches thick; having a total weight of 1,041 lbs.

Figure 4:
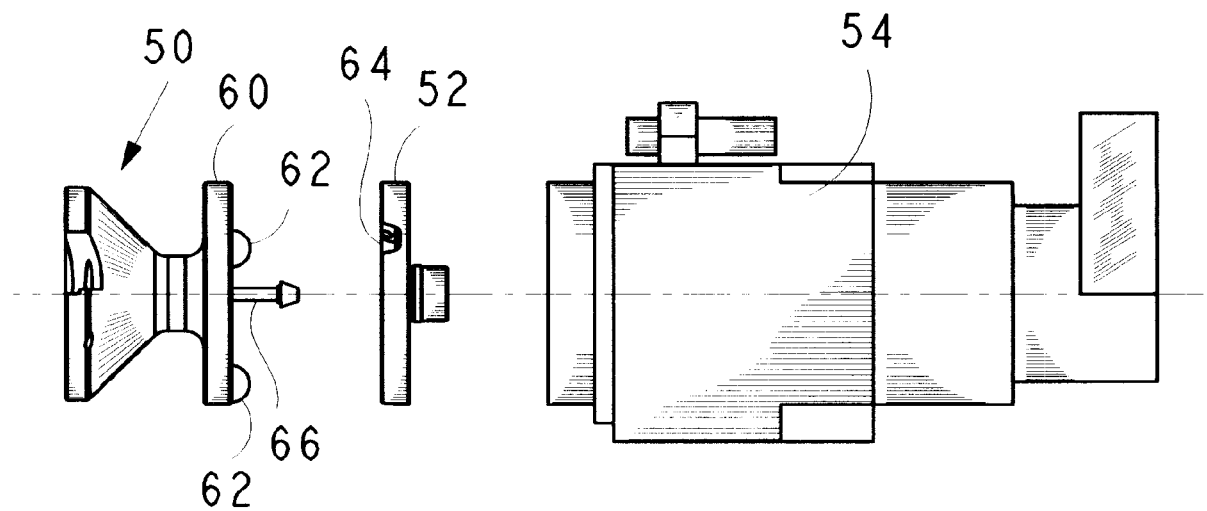
FIG. 4 is an exploded side view of the elements of the tool spindle of the ophthalmic lens generating apparatus of the preferred embodiment.
Figure 5:
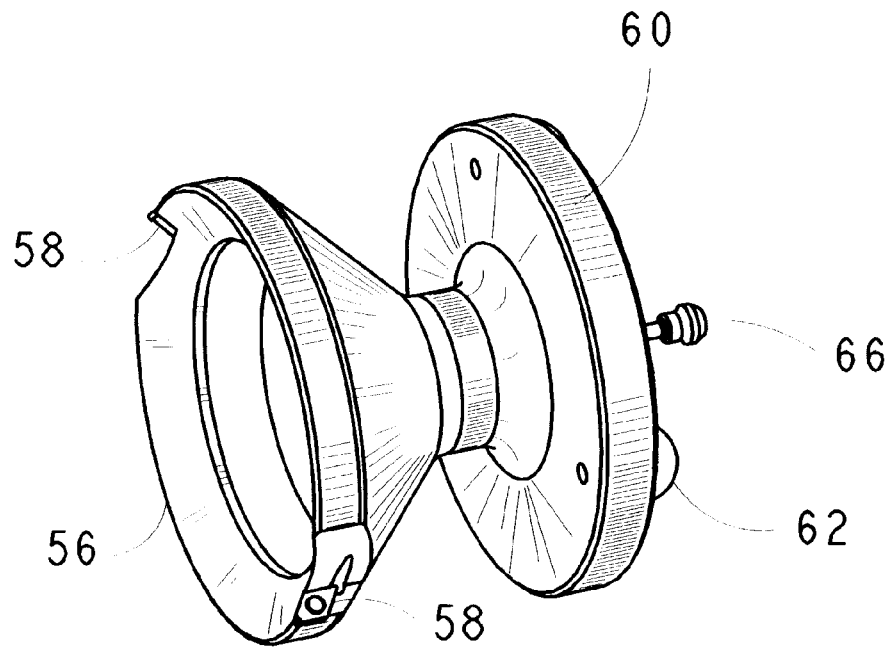
FIG. 5 is a side perspective view of the lens surfacing tool of the ophthalmic lens generating apparatus of the preferred embodiment.

Referring now to FIGS. 4 and 5, the tool spindle of the lens generating apparatus of the preferred embodiment is illustrated therein. The major elements of the tool spindle 20 are: the cutting tool 50, the circular face plate 52 and the spindle drive motor 54. The cutting tool 50 comprises a cup-shaped body 56 having at least two cutter inserts 58 made of a material containing tungsten-carbide or similar material. The cup-shaped body 56 is mounted on a circular disk plate 60 having means 62 for positioning within mating grooves 64 on the circular face plate 52 and engaging the circular face plate 52. The cutting tool 50 also has a tension rod 66 for extending through the face plate 52 and for engaging with a latching sleeve (not shown) mounted inside the rotating arbor or core of the spindle drive motor 54. This type of tool-mounting arrangement is herein referred to as a kinematic coupling, and is described in co-pending U.S. patent application Ser. No. 08/561,404, filed on Nov. 21, 1995. The tool-mounting arrangement maintains the cutting tool axis of rotation coaxial with the axis of rotation of the motor rotating arbor.

The tool 50 illustrated in FIG. 5 is preferably balanced to a precision characterized by a total displacement peak-to-valley of 1.0 microinch (25 nanometer) when this tool is rotating at an operational speed of about between 7,500 and 10,000 RPM.

The advantage of using a cutting tool 50 with a kinematic coupling is primarily for allowing quick and precise replacement of tools on the tool spindle 20. More importantly, the tool and kinematic coupling have a first large circular disk plate 60 and a second circular face plate 52 having respectively a large moment of inertia for absorbing torsional vibration in the tool spindle 20. Preferably, the disk plate 60 has a moment of inertia expressed in weight units of about 9 lbs-in$^2$, and the face plate 52 has a moment of inertia expressed in weight units of about 24 lbs-in$^2$.

Furthermore, the spindle drive motor 54 is also selected such that its moment of inertia is as large as practically possible. The tool spindle 20 of the ophthalmic lens generator of the preferred embodiment is characterized by the magnitude of the following representative moments of inertia. The spindle drive motor 54 including face plate 52 has a moment of inertia expressed in weight units of 70.1 lbs-in$^2$, and the moment of inertia of a typical cutting tool 50 with disk plate 60, is 11.3 lbs-in$^2$.

Figure 6:
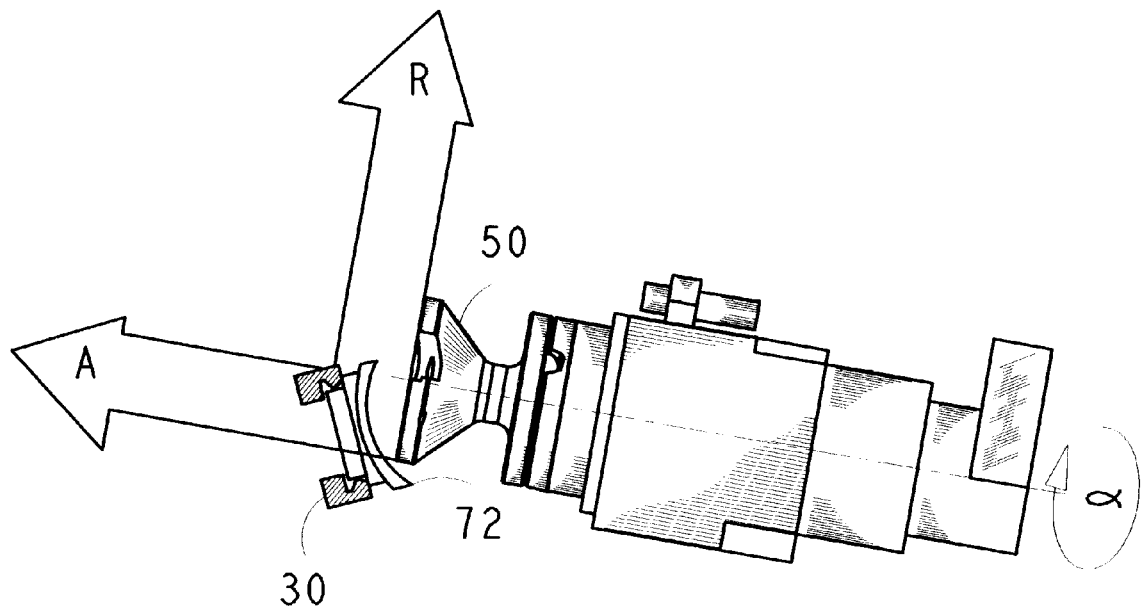
FIG. 6 illustrates a schematic top view of a typical lens surfacing operation.
Figure 7:
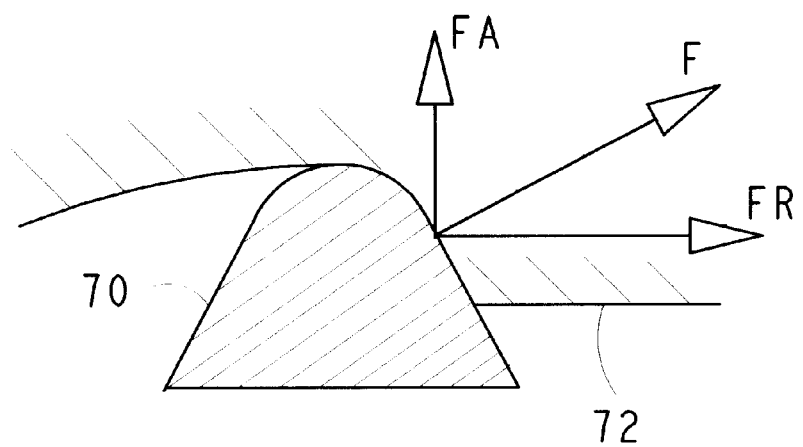
FIG. 7 is a vector diagram illustrating the forces present during a lens surfacing operation.

Referring now to FIGS. 6 and 7, there is illustrated therein a vectorial representation of the forces and vibrations present during a lens generating operation. The radial vibrations of the rotating spindle are represented by the arrow labelled "R". The axial vibrations are represented by arrow labelled "A", and the torsional vibrations represented by the arrow labelled "α".

The radial vibrations "R" are in a direction generally perpendicular to the axis of rotation of the tool. The axial vibrations "A" are in a direction along the axis of rotation of the tool, and the torsional vibrations are in an angular direction relative to the axis of rotation of the tool 50.

Likewise, the vectorial illustration of FIG. 7 represents the forces present during the removing of material from the surface of the lens 72. The cutting force "F" is generally perpendicular to the cutting edge of the tool. The force "F" has a radial component "$F_R$" in the feed direction and an axial component "$F_A$" in an axial direction relative to the axis of rotation of the tool 50.

The magnitude of the cutting force "F" and of its components "$F_R$" and "$F_A$" are proportional to the feed rate and the depth of cut of the tool insert 70. Therefore, when a radial, axial or torsional vibration disrupts the thrust of the tool 50, both the radial "$F_R$" and axial "$F_A$" components are inevitably affected.

In the light of the foregoing, one will understand that any vibration in the radial, axial or circumferential direction relative to the tool spindle has a direct effect on the magnitude of the cutting forces. Because a certain degree of elasticity is found in most machine structures, variations in the cutting forces are often accompanied by microscopic deflections in the elements of the apparatus, and are translated into more or less material being taken off from the surface of the lens.

One will also appreciate that radial vibrations are translated into dominant radial forces "$F_R$" which are oriented in a plane which is substantially tangent to the surface of the lens. Therefore, the defects associated by fluctuations in the radial forces "$F_R$" have a relatively shallow depth. The defects associated by fluctuating axial forces "$F_A$", however, have a deeper dimension and contribute largely to the optical quality of a generated lens.

As noted above, the apparatus of the preferred embodiment has a massive upright granite block 42 for increasing the stiffness of the structure supporting the lens holder 30, and for absorbing the axial vibrations of the tool spindle 20 and the lens holder 30. The tool spindle 20 of the apparatus of the preferred embodiment has a large moment of inertia whereby any fluctuations in the angular speed of the tool spindle are efficiently reduced to imperceptible levels. Hence, the masses of the base 40, the upright block 42 and the moment of inertia of the tool spindle 20 cooperate with one-another for reducing the overall vibration of the elements of the apparatus. Most importantly the masses of the upright block 42 and the spindle 20 cooperate with one-another for reducing the axial vibration of the tool 50 and the lens holder 30.

The operation of the ophthalmic lens generating apparatus of the preferred embodiment is characterized by a remarkable smoothness wherein a high quality optical surface is generated in a single operation. The ophthalmic lenses generated thereon do not need further polishing. Surface roughness measurements of under 1 micron are generally consistently obtainable on the lenses generated by the apparatus of the preferred embodiment. A surface roughness measure being defined as the arithmetic average deviation from the best fit surface of the lens.

As a further disclosure, the circular face plate 52 and the circular disk plate 60 have each sufficient dimensions for accommodating dynamic vibration absorbers such as those illustrated in FIGS. 8 to 11. Dynamic vibration absorbers are often referred to in the art of vibration analysis as auxiliary mass dampers and are used to reduce the torsional or angular vibration in rotating elements. Although quantitative results are not yet available for the application of these absorbers to the tool spindle 20 of the apparatus of the preferred embodiment, it is believed that the optical surfaces generated by the apparatus of the preferred embodiment can still be improved by the use of such accessories.

A first suggested model of dynamic absorber is illustrated in FIGS. 8 and 9. A circular disk plate 60' has a series of vibration dampers comprising each a cylindrical mass 80 which is loosely confined in a through hole 82 in the disk plate 60'. Each cylindrical mass 80 has a circular groove 84 around its cylindrical surface for mating over a circular rib 86 around the inside surface of the through hole 82 such that the cylindrical mass 80 is held in a coplanar alignment with the circular plate 60'.

A second suggested type of dynamic absorber which is compatible with the shape of the circular face plate 52 or of the circular disk plate 60 is illustrated in FIGS. 10 and 11. In this example, a circular disk plate 60" has a groove around the rim portion thereof. A ring-shaped mass 90 is resiliently bonded into this groove by means of a layer of soft rubber 88 or other similar elastic material, such that the ring-shaped mass 90 can absorb fluctuations in the circumferential speed of the disk plate 60".

Although the dynamic vibration absorbers thus described and their effects in reducing torsional vibration are known in the art of vibration analysis and rotating machinery, the lens generating apparatus of the prior art do not have a structure for accommodating such devices. The tool spindle 20 of the apparatus of the preferred embodiment, however, has a circular face plate 52, and a circular disk plate 60 wherein the dampers may be advantageously readily incorporated.

While the above description provides a full and complete disclosure of the preferred embodiment of this invention, various modifications, alternate constructions and equivalents may be employed without departing from the true spirit and scope of the invention. Such changes might involve alternate materials, components, structural arrangements, sizes, construction features or the like. Therefore, the above description and the illustrations should not be construed as limiting the scope of the invention which is defined by the appended claims.

I claim:

1. An apparatus for generating an optical surface on an ophthalmic lens, comprising:

a tool spindle having a motor and a lens surfacing tool for mounting on a rotatable arbor of said motor for rotation by said motor;

first actuated linear slide means having a longitudinal axis and a first movable support means affixed to said tool spindle for movably supporting said tool spindle along said longitudinal axis;

lens holder means having structure connected to said first actuated linear slide means and chuck means mounted on said structure for retaining an ophthalmic lens with a perimeter thereof defining a plane being substantially perpendicular to said longitudinal axis, said tool spindle being movable along a prescribed path relative to said chuck means; and massive block means associated with said chuck means and having a dimension extending across said longitudinal axis when said longitudinal axis is made to extend inside a perimeter of an ophthalmic lens when said ophthalmic lens is supported in said chuck means;

whereby when said apparatus is generating an optical surface of an ophthalmic lens, vibrations of said chuck means having an amplitude along said longitudinal axis are dampened by said massive block means and a quality of a surface finish on said ophthalmic lens is thereby enhanced.

2. An apparatus for generating an optical surface on an ophthalmic lens as claimed in claim 1 further comprising:

massive base means associated with and supporting said first actuated linear slide means and having a lengthwise measure extending along said longitudinal axis, for dampening vibrations of said tool spindle and said chuck means having an amplitude in a direction generally perpendicular to said longitudinal axis.

3. An apparatus for generating an optical surface on an ophthalmic lens as claimed in claim 2 wherein said tool spindle has a first circular body for mounting on the rotatable arbor of said motor and having a moment of inertia of sufficient magnitude to dampen torsional vibrations of said tool spindle.

4. An apparatus for generating an optical surface on an ophthalmic lens as claimed in claim 3 wherein said tool spindle has a second circular body for mounting on the rotatable arbor of said motor and having a moment of inertia of sufficient magnitude to further dampen torsional vibrations of said tool spindle.

5. An apparatus for generating an optical surface on an ophthalmic lens, comprising:

a tool spindle having a motor and a lens surfacing tool for mounting on a rotatable arbor of said motor for rotation by said motor;

first actuated linear slide means having a longitudinal axis and a first movable support means affixed to said tool spindle for movably supporting said tool spindle along said longitudinal axis;

lens holder means having structure connected to said first actuated linear slide means and chuck means mounted on said structure for retaining an ophthalmic lens with a perimeter thereof defining a plane being substantially perpendicular to said longitudinal axis, said tool spindle being movable along a prescribed path relative to said chuck means;

massive block means associated with said chuck means and having a dimension extending across said longitudinal axis;

massive base means associated with and supporting said first actuated linear slide means and having a lengthwise measure extending along said longitudinal axis;

said tool spindle having a first circular body for mounting on said rotatable arbor of said motor and having a moment of inertia of sufficient magnitude for dampening torsional vibrations of said tool spindle;

said tool spindle having a second circular body for mounting on said rotatable arbor of said motor and having a moment of inertia of sufficient magnitude for further dampening torsional vibrations of said tool spindle; and said tool spindle further comprising coupling means for removably retaining said lens surfacing tool to said rotatable arbor, and said first and second circular bodies being integral components of said coupling means;

whereby when said apparatus is generating an optical surface of an ophthalmic lens, vibrations of said chuck means having an amplitude along said longitudinal axis are dampened by said massive block means; vibrations of said chuck means and said tool spindle having an amplitude in a direction generally perpendicular to said longitudinal axis are dampened by said massive base means, and torsional vibrations of said tool spindle are dampened by said coupling means, and a quality of a surface finish on said ophthalmic lens is thereby enhanced.

6. An apparatus for generating an optical surface on an ophthalmic lens as claimed in claim 5 wherein said coupling means is a kinematic-type coupling.

7. An apparatus for generating an optical surface on an ophthalmic lens as claimed in claim 5 wherein at least one of said first and second circular bodies includes an auxiliary mass damper for further dampening torsional vibration of said tool spindle.

8. An apparatus for generating an optical surface on an ophthalmic lens as claimed in claim 5 wherein said massive base means is a flat rectangular base mounted under said first actuated linear slide means, and said massive block means is an upright block mounted at and across an end of said flat rectangular base.

9. An apparatus for generating an optical surface on an ophthalmic lens as claimed in claim 8 wherein said flat rectangular base and said upright block are made of granite and weigh about 1500 lbs. and about 1,000 lbs. respectively.

10. An apparatus for generating an optical surface on an ophthalmic lens as claimed in claim 9, wherein the total moment of inertia of said tool spindle expressed in weight units is at least about 81.4 lbs-in$^2$.

11. An apparatus for generating an optical surface on an ophthalmic lens as claimed in claim 5 wherein:

said lens surfacing tool is a circular-cup-shaped lens surfacing tool;

said first movable support means comprises an actuated turntable having an axis of rotation perpendicular to said longitudinal axis, for adjustably angling an axis of operation of said tool spindle relative to said longitudinal axis;

said lens holder means comprises a second actuated linear slide means affixed to said structure and to said chuck means for moving said chuck means in a direction perpendicular to said longitudinal axis; and wherein said first and said second actuated linear slide means and said turntable are simultaneously actuatable, such that said prescribed path and an arc on said lens surfacing tool contacting said lens during a lens generating process define a toric surface on said lens.

12. An apparatus for generating an optical surface on an ophthalmic lens as claimed in claim 11, wherein said first and second actuated linear slide means have pressurized fluid bearings.

13. An apparatus for generating an optical surface on an ophthalmic lens as claimed in claim 11 wherein said circular-cup-shaped tool has cutting inserts mounted on a periphery thereof, an operational rotational speed of between about 7,500 RPM and about 10,000 RPM and a dynamic balance at said rotational speed being characterized by a total radial runout of about 1.0 microinch.

14. An apparatus for generating an optical surface on an ophthalmic lens as claimed in claim 5, wherein said first actuated linear slide means has a horizontal planar structure and a turntable mounted thereon for movably supporting said tool spindle.

15. An apparatus for generating an optical surface on an ophthalmic lens as claimed in claim 14, further comprising a second actuated linear slide means having a vertical axis extending vertically relative to said horizontal planar structure; said second actuated linear slide means being connected to said massive block means and to said chuck means for movably supporting said chuck means along said vertical axis relative to said massive block means.

16. An apparatus for generating an optical surface on an ophthalmic lens as claimed in claim 15, further comprising a third actuated linear slide means having a transversal horizontal axis extending perpendicularly relative to said longitudinal and vertical axis; said third linear slide means being connected to said massive block means and to said second slide means for movably supporting said second slide means along said transversal horizontal axis relative to said massive block means.

17. An apparatus for generating an optical surface on an ophthalmic lens, comprising:

a tool spindle having a motor and a lens surfacing tool mountable on and rotatable by the rotatable arbor of said motor;

coupling means connected to said rotatable arbor for removably retaining a lens surfacing tool to said rotatable arbor, and;

first and second circular bodies associated with said coupling means and with said rotatable arbor for rotation by said motor, said first and second circular bodies having respective moment of inertia of a first and second determinable magnitudes;

whereby when said apparatus is generating an optical surface on an ophthalmic lens, torsional vibrations of said tool spindle are dampened by inertia of said first and second circular bodies.

18. An apparatus for generating an optical surface on an ophthalmic lens as claimed in claim 17, further comprising:

first actuated linear slide means having a longitudinal axis and first movable support means affixed to said tool spindle for movably supporting said tool spindle for movement along said longitudinal axis;

lens holder means having structure connected to said first actuated linear slide means and chuck means mounted on said structure for retaining an ophthalmic lens with a perimeter thereof defining a plane being substantially perpendicular to said longitudinal axis; and said tool spindle being movable along a prescribed path relative to said chuck means.

19. An apparatus for generating an optical surface on an ophthalmic lens as claimed in claim 18, further comprising massive block means associated with said chuck means and having a dimension extending across said longitudinal axis, the mass of said massive block means being of sufficient magnitude to dampen vibrations of said chuck means having an amplitude along said longitudinal axis.

20. An apparatus for generating an optical surface on an ophthalmic lens as claimed in claim 18 additionally comprising a massive base means associated with said first actuated linear slide means and having a lengthwise measure extending along said longitudinal axis, for dampening vibrations of said tool spindle and said chuck means having an amplitude in a direction generally perpendicular to said longitudinal axis.

* * * * *